Patented Mar. 6, 1945

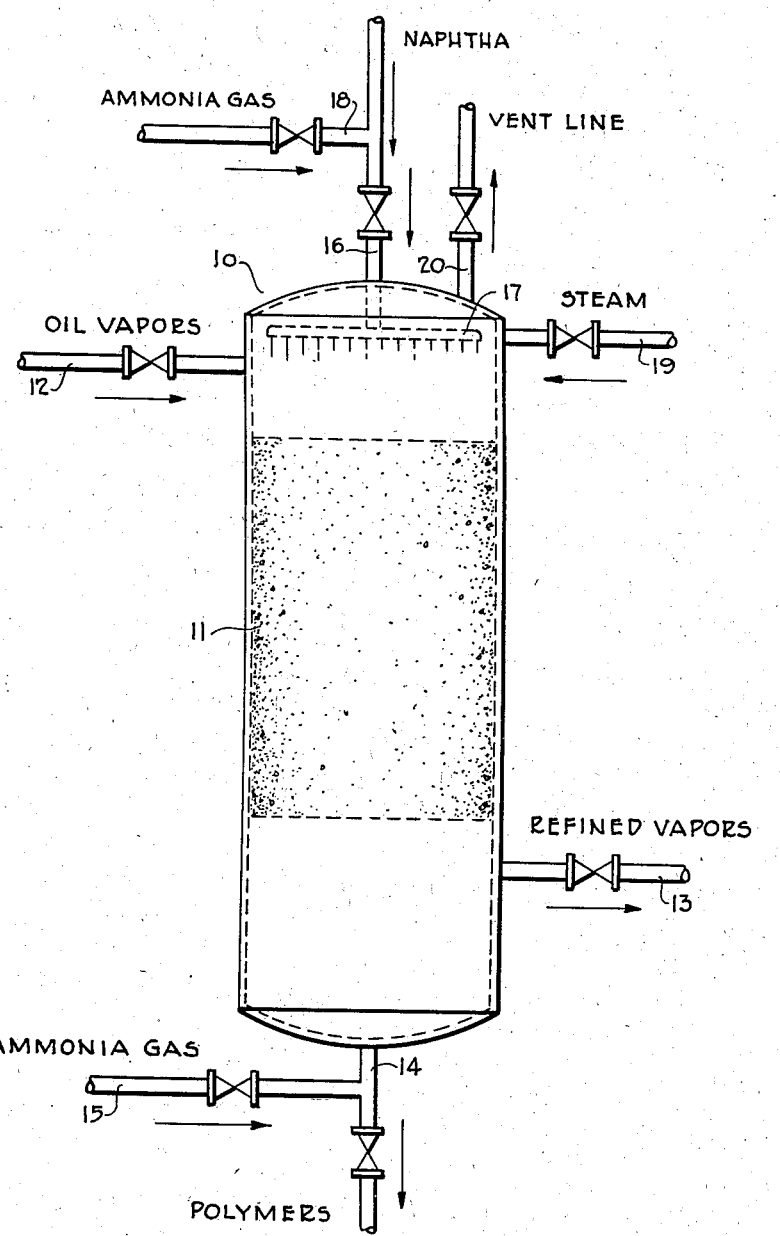

2,370,713

UNITED STATES PATENT OFFICE 2,370,713

REVIVIFYING CATALYTIC MATERIAL

Lawrence Carlson, Bloomfield, N. J., assignor to The Gray Processes Corporation, Jersey City, N. J., a corporation of Delaware Application May 27, 1941, Serial No. 395,354

2 Claims. (Cl. 196—96)

This invention relates to improvements in revivifying catalytic material used in the catalytic treatment of hydrocarbons.

The invention is concerned with the treatment of solid adsorbent catalytic material which has become spent or ineffective, for the purpose of rendering the material suitable for reuse. The invention relates particularly to a revivification treatment for solid adsorbent materials which in the course of the treatment of the hydrocarbons have become impregnated with certain high molecular weight or tarry hydrocarbon substances which render such adsorbent material inactive.

In present methods of revivifying such material it is necessary, in order to revivify the material for further use, to subject it to a treatment involving a burning or oxidation step in order to sufficiently remove the occluded substances that render it inactive. The present invention provides a method of revivification without the necessity of any burning or oxidizing treatment and has the additional advantage that the revivification can be accomplished in situ.

In accordance with the invention the spent adsorbent catalytic material is washed with a hydrocarbon solvent in the presence of ammonia. In practicing the invention the spent adsorbent material is subjected to the combined action of non-aqueous ammonia and hydrocarbon fluid which functions to effectually remove the occluded substances which render the adsorbent material inactive and serves to revivify the catalytic material for reuse in the treatment of hydrocarbons.

The invention contemplates the revivification of various solid contacting or treating materials having adsorptive or catalytic surfaces, such as fuller's earth and adsorbent clays of various kinds, silica-alumina catalysts and various solid adsorptive materials, used in the treatment of hydrocarbons, and is particularly adapted for the revivification of such materials after use in the treatment of hydrocarbons at relatively low temperatures below coke forming temperatures, such as in the polymerizating treatment of hydrocarbons to effect removal of the more unstable constituents so as to stabilize the hydrocarbons as regards gum formation or color formation, in the catalytic polymerization of normally gaseous hydrocarbons to form normally liquid hydrocarbons in the gasoline boiling range, and in various operations in which the treatment tarry or high molecular weight components are formed on the adsorptive or contacting surfaces. By washing the spent adsorptive or catalytic material with a hydrocarbon or solvent of the occluded tarry matter in the presence of non-aqueous ammonia the removal of the occluded matter is accomplished without disintegrating the adsorptive or catalytic material and the catalytic or adsorptive properties thereof are revivified.

The invention will be described specifically herein by reference to the revivification of adsorbent clay used in the treatment of hydrocarbon vapors to effect polymerization of the more unstable hydrocarbons to effect removal of objectionable gum-forming and color-forming constituents and to stabilize the hydrocarbon as regards gum formation and color formation.

For the purpose of more fully disclosing the invention reference is had to the accompanying diagrammatic drawing which illustrates apparatus adapted for the practice of the invention.

In the apparatus 10 represents a treating tower containing a bed 11 of solid adsorbent clay such as fuller's earth. The vapors to be treated enter the tower 11 through a vapor line 12 from a still such as a cracking still or the fractionator thereof. The vapors in flowing through the adsorbent clay are subjected to certain reactions involving selective polymerization of the more reactive hydrocarbons and the resultant treated vapors and polymers or condensate pass to the bottom of the tower wherein the vapors separate from liquid products and flow out through a vapor line 13, while the polymers or liquid products are withdrawn through a line 14.

After the polymerizing treatment has continued for a time the adsorbent material is reduced in activity due to the collection in the treating material of tarry products of polymerization which eventually destroy the catalytic action of the clay. In current practice when the clay has become so reduced in efficiency that it is undesirable to use it any longer in the polymerizing process the passage of the vapors through the tower is stopped and the clay is removed from the tower. The clay is then subjected to a revivification treatment which, as stated, involves as an essential step a burning or oxidizing operation.

In accordance with my invention the spent clay need not be removed from the tower and may be revivified in situ. To provide for such revivification a line 15 extending to a suitable source of ammonia gas may be conveniently connected to the polymer line 14 for passing ammonia gas into the bed of adsorbent clay. A solvent line 16 leads to a source of suitable solvent, such as naphtha, and preferably terminates in a spray 17 for spraying the solvent over the bed of catalytic material. A line 18 is provided for admixing ammonia gas with the hydrocarbon being introduced through the line 16. A line 19 is provided for introducing steam and a vent line 20 is provided for venting gases from the tower at times when it is not desired to vent the gases through the regular vapor line 13.

In practicing the invention when it is desired to revivify the catalytic material the introduction of the hydrocarbon vapors through the line 12 is stopped and the liquid is withdrawn through the line 14. Steam may then be introduced for the purpose of removing liquid which may remain in the clay bed. The clay is then washed with a mixture of naphtha and ammonia introduced through the spray line 17. The solvent extract may be withdrawn through the polymer line. After the wash with the ammonia and hydrocarbon the clay bed may be steamed to remove any liquid remaining in the bed and the clay is then ready for further use in the treatment of the oil vapors.

In a preferred method of accomplishing the revivification ammonia gas is introduced, through the line 15, into the tower 11 to thoroughly saturate the adsorbent or catalytic material with ammonia. The clay will absorb considerable quantities of the ammonia gas. The ammonia-saturated material is then washed either with hydrocarbon alone or with a mixture of hydrocarbon and ammonia gas.

In an example of the invention cracked gasoline vapors from a cracking operation are passed through a bed of fuller's earth to effect polymerization of the more reactive hydrocarbons including particularly the diolefins and to accomplish stabilization of the gasoline with respect to gum formation and color formation. In accomplishing the revivification the fuller's earth is steamed to remove retained liquid. The fuller's earth is then saturated with ammonia gas after which it is washed with a petroleum naphtha having a boiling range of 350° F.–450° F., additional ammonia gas being injected into the naphtha stream. The extract is drawn off the clay and the clay is then steamed to remove fluids retained in the clay. The resultant ammonia water is collected.

A particular advantage of the invention is that when washing the adsorbent material with the solvent in the presence of the ammonia no heating is required to accomplish the effective removal of the occluded tarry material. The pretreating with steam may operate to raise the temperature of the clay but if desired the clay may be permitted to cool prior to treatment with the hydrocarbon solvent and ammonia. As a matter of fact, low temperatures appear to be desirable since the absorption of the ammonia gas by the adsorbent material is greater at the lower temperatures and the adsorbent material may be effectually revivified at approximately normal temperatures. When treating the clay at normal atmospheric temperatures the introduction of the ammonia gas into the clay will cause a rise in temperature up to about 100° F. to 120° F. due to the heat of absorption and the subsequent washing with naphtha or with naphtha saturated with ammonia is completely effective in revivifying the clay.

Although a preferred embodiment of the invention has been described herein, it will be understood that various changes and modifications may be made therein, while securing to a greater or less extent some or all of the benefits of the invention, without departing from the spirit and scope thereof.

I claim:

1. In a process for the catalytic treatment of hydrocarbons and for the revivification of the catalyst in situ the process that comprises passing hydrocarbon vapors through a bed of solid adsorbent catalytic material at a temperature at which polymerization takes place but below a coke-forming temperature, continuing the passage of the vapors through the catalytic material until the catalytic activity is reduced by the deposit of products of reaction on the catalytic material, thereupon discontinuing the passage of vapors to the catalytic material, steaming the bed to effect removal of any retained liquid, cooling the bed to increase the absorptive capacity of the catalytic material for ammonia, passing ammonia gas through the bed to saturate the adsorbent catalytic material therewith, thereafter washing the ammonia-saturated catalytic material with naphtha to effect removal of the said reaction products deposited on the catalytic material and produce revivification thereof, steaming the bed to effect removal of retained fluids and prepare the bed for the resumption of the treatment of the hydrocarbon vapors.

2. In a process for the catalytic treatment of hydrocarbons and for the revivification of the catalyst in situ the process that comprises passing hydrocarbon vapors through a bed of solid adsorbent catalytic material to effect polymerization of unstable hydrocarbons, continuing the passage of the vapors through the catalytic material until the catalytic activity is reduced by the deposit of products of reaction on the catalytic material, thereupon discontinuing the passage of vapors to the catalytic material, steaming the bed to effect removal of any retained liquid, cooling the bed to approximately normal atmospheric temperature to increase the absorptive capacity of the catalytic material for ammonia, passing ammonia gas through the bed to saturate the adsorbent catalytic material therewith, thereafter washing the ammonia-saturated catalytic material with naphtha in the presence of added ammonia gas to effect removal of the said reaction products deposited on the catalytic material and produce revivification thereof, steaming the bed to effect removal of retained fluids and prepare the bed for the resumption of the treatment of the hydrocarbon vapors.

LAWRENCE CARLSON.